US011431484B2

United States Patent
(12) United States Patent
Garagiola et al.

(10) Patent No.: US 11,431,484 B2
(45) **Date of Patent: *Aug. 30, 2022**

(54) BLOCKCHAIN TRANSACTION PRIVACY ENHANCEMENT THROUGH BROADCAST ENCRYPTION

(71) Applicant: International Business Machines Corporation, Armonk, NY (US)

(72) Inventors: Andres Garagiola, Baradero (AR); John B. Geagan, III, San Jose, CA (US); Jeronimo Irazabal, Puenos Aires (AR); Guillermo R. Lopez, Manuel Gonnet (AR); Diego A. Masini, La Plata (AR); Dulce Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/733,220

(22) Filed: Jan. 2, 2020

(65) Prior Publication Data

US 2020/0145204 A1 May 7, 2020

Related U.S. Application Data

(63) Continuation of application No. 15/814,485, filed on Nov. 16, 2017, now Pat. No. 10,567,168.

(51) Int. Cl.

*H04L 9/08* (2006.01)
*H04L 9/32* (2006.01)

(Continued)

(52) U.S. Cl.

CPC .......... *H04L 9/0836* (2013.01); *H04L 9/0637* (2013.01); *H04L 9/0825* (2013.01);

(Continued)

(58) Field of Classification Search

CPC ........ H04L 9/0836; H04L 9/3255; H04L 9/14

See application file for complete search history.

(56) References Cited

U.S. PATENT DOCUMENTS 8,483,390 B2 ‡ 7/2013 Wei ...................... H04L 9/0833 380/25

8,625,784 B2 ‡ 1/2014 Sung .................... H04L 9/0841 380/44

(Continued)

OTHER PUBLICATIONS

Prasad, A. & Mathews, D., An Adaptively Secure Identity-Based Broadcast Encryption using CAST Algorithm. International Journal of Current Engineering and Technology, 2015, vol. 5, No. 6.‡

(Continued)

*Primary Examiner* — Viral S Lakhia

(57) ABSTRACT

An example operation may include one or more of storing a broadcast encryption tree comprising a set of cryptographic keys disposed in a hierarchical tree format, distributing a partial set of keys from the broadcast encryption tree to each respective peer from among a group of peers included in a blockchain network, receiving, from a user device, an identification of at least one peer included in the group of peers for processing a blockchain transaction, selecting a subset of keys from among the set of cryptographic keys in the broadcast encryption tree which enables at least one peer to decrypt transactions and doesn't enable the remaining peers included in the group of peers to decrypt transactions, and transmitting broadcast encryption information about the selected subset of keys to the user device for performing encryption of the transactions.

20 Claims, 7 Drawing Sheets

200

Peer 1 281
Peer 2 282
Peer 3 283
Peer 4 284
Blockchain Nodes 280
Access Granted to 3rd Party Apps 254
Applications 270
API 260
Application Code 250
Hashed Identifier 252
Blockchain Platform 205
Trust Services (Crypto) 230
Blockchain Layer 220 (Virtual Execution Environment)
Infrastructure 210

(51) Int. Cl.
*H04L 9/14* (2006.01)
*H04L 9/06* (2006.01)
*H04L 9/00* (2022.01)

(52) U.S. Cl.
CPC .............. *H04L 9/14* (2013.01); *H04L 9/3239* (2013.01); *H04L 9/3255* (2013.01); *H04L 9/3263* (2013.01); *H04L 9/50* (2022.05)

(56) References Cited

U.S. PATENT DOCUMENTS 9,774,578 B1 * 9/2017 Ateniese ................. G06F 21/53
9,935,772 B1 * 4/2018 Madisetti ............ G06F 21/6209
10,333,909 B2 * 6/2019 Dhar ....................... H04L 9/088
10,397,195 B2 * 8/2019 Jain ....................... H04L 9/0861
10,484,346 B2 * 11/2019 Russinovich ......... H04L 63/123
10,567,168 B2 * 2/2020 Garagiola ................. H04L 9/14
10,769,135 B1 * 9/2020 Zhuo ................... G06F 16/2379
10,805,085 B1 * 10/2020 Liang .................... H04L 9/3247
10,824,601 B1 * 11/2020 Zhuo ..................... H04L 9/0637
10,965,448 B1 * 3/2021 Raman .................. H04L 67/108
2010/0183150 A1 * 7/2010 Lee ....................... H04L 9/0861 380/278
2014/0195809 A1 * 7/2014 Solow ................... H04L 9/0822 713/171
2017/0091750 A1 ‡ 3/2017 Maim ................... H04L 9/3236
2017/0132621 A1 * 5/2017 Miller .................. G06Q 20/065
2017/0230344 A1 * 8/2017 Dhar ....................... H04L 9/088
2017/0317997 A1 ‡ 11/2017 Smith ................... H04L 9/0861
2017/0353309 A1 ‡ 12/2017 Gray ....................... G06F 21/53
2018/0183602 A1 * 6/2018 Campagna ................ H04L 9/14
2018/0183774 A1 * 6/2018 Campagna ............ H04L 9/3247
2018/0204192 A1 ‡ 7/2018 Whaley ............. G06Q 20/0658
2018/0253451 A1 ‡ 9/2018 Callan ................... H04L 9/3239
2018/0331832 A1 ‡ 11/2018 Pulsifer ................. H04L 9/3247
2018/0359089 A1 ‡ 12/2018 Innes ........................ H04L 9/30
2018/0365688 A1 ‡ 12/2018 He ..................... G06Q 20/3829
2019/0013943 A1 * 1/2019 Maim ..................... G06F 21/51
2019/0036678 A1 ‡ 1/2019 Ahmed ................... H04L 9/006
2019/0057382 A1 ‡ 2/2019 Wright ............... G06Q 20/3827
2019/0081790 A1 * 3/2019 Mandal ............... H04L 63/0442
2019/0108516 A1 ‡ 4/2019 Jawaharlal ......... G06Q 20/3829
2019/0149325 A1 * 5/2019 Garagiola ............. H04L 9/3255 380/278
2019/0158470 A1 ‡ 5/2019 Wright .................... H04W 4/70
2019/0268284 A1 ‡ 8/2019 Karame ................ H04L 47/828
2021/0100714 A1 * 4/2021 Marin .................... A61B 17/64

OTHER PUBLICATIONS

Sakai, R. & Furukawa, J., (2007). Identity-Based Broadcast Encryption. IACR Cryptology ePrint Archive, 217.‡

Prisco, G., MIT Media Lab Releases Code for Digital Certificates on the Blockchain. Retrieved fromhttps://bitcoinmagazine.com/articles/mit-medialab-releases-code-for-digital-certificates-on-the-blockchain-1465404945/, 2016.‡

Mercer, R., Privacy on the Blockchain: Unique Ring Signatures, arXiv preprint arXiv: 1612.01188, 2016.‡

Zyskind, G. & Nathan, O., Decentralizing privacy: Using blockchain to protect personal data. In Security and Privacy Workshops (SPW), 2015 IEEE, 180-184.‡

Mercer, "Privacy on the Blockchain: Unique Ring Signatures," arXiv preprint arXiv: 1612.01188, 2016.

Prasad et al., "An Adaptively Secure Identity-Based Broadcast Encryption using CAST Algorithm", International Journal of Current Engineering and Technology, 2015, vol. 5, No. 6.

Prisco, "MIT Media Lab Releases Code for Digital Certificates on the Blockchain", retrieved from https://bitcoinmagazine.com/articles/mit-medialab-releases-code-for-digital-certificates-on-the-blockchain-1465404945/, 2016.

Sakai et al., "Identity-Based Broadcast Encryption", IACR Cryptology ePrint Archive, 2017.

Zyskind et al., "Decentralizing privacy: Using blockchain to protect personal data. In Security and Privacy Workshops (SPW)", 2015 IEEE, 180-184.

List of IBM Patents or Patent Applications Treated as Related, Feb. 6, 2020.

Garagiola et al., "Blockchain Transaction Privacy Enhancement Through Broadcast Encryption", U.S. Appl. No. 15/814,485, filed Nov. 16, 2017 (a copy is not provided as this application is available to the Examiner).

* cited by examiner
‡ imported from a related application 100
110
User
Network
120
Peer A
Peer B
Peer C
Peer D
Peer E
Peer F
Peer G
Peer H
130
BCA 1
BCA 2

320

| Peers | Keys |
| --- | --- |
| Peer A | 3, 6, 12 |
| Peer B | 1, 6, 12 |
| Peer C | 2, 7, 12 |
| Peer D | 2, 5, 12 |
| Peer E | 4, 11, 14 |
| Peer F | 4, 9, 14 |
| Peer G | 4, 10, 15 |
| Peer H | 4, 10, 13 |

300B

320

| Peers | Keys |
|---|---|
| Peer A | 3, 6, 12 |
| Peer B | 1, 6, 12 |
| Peer C | 2, 7, 12 |
| Peer D | 2, 5, 12 |
| Peer E | 4, 11, 14 |
| Peer F | 4, 9, 14 |
| Peer G | 4, 10, 15 |
| Peer H | 4, 10, 13 |

330

Keys Selected = (4, 6)

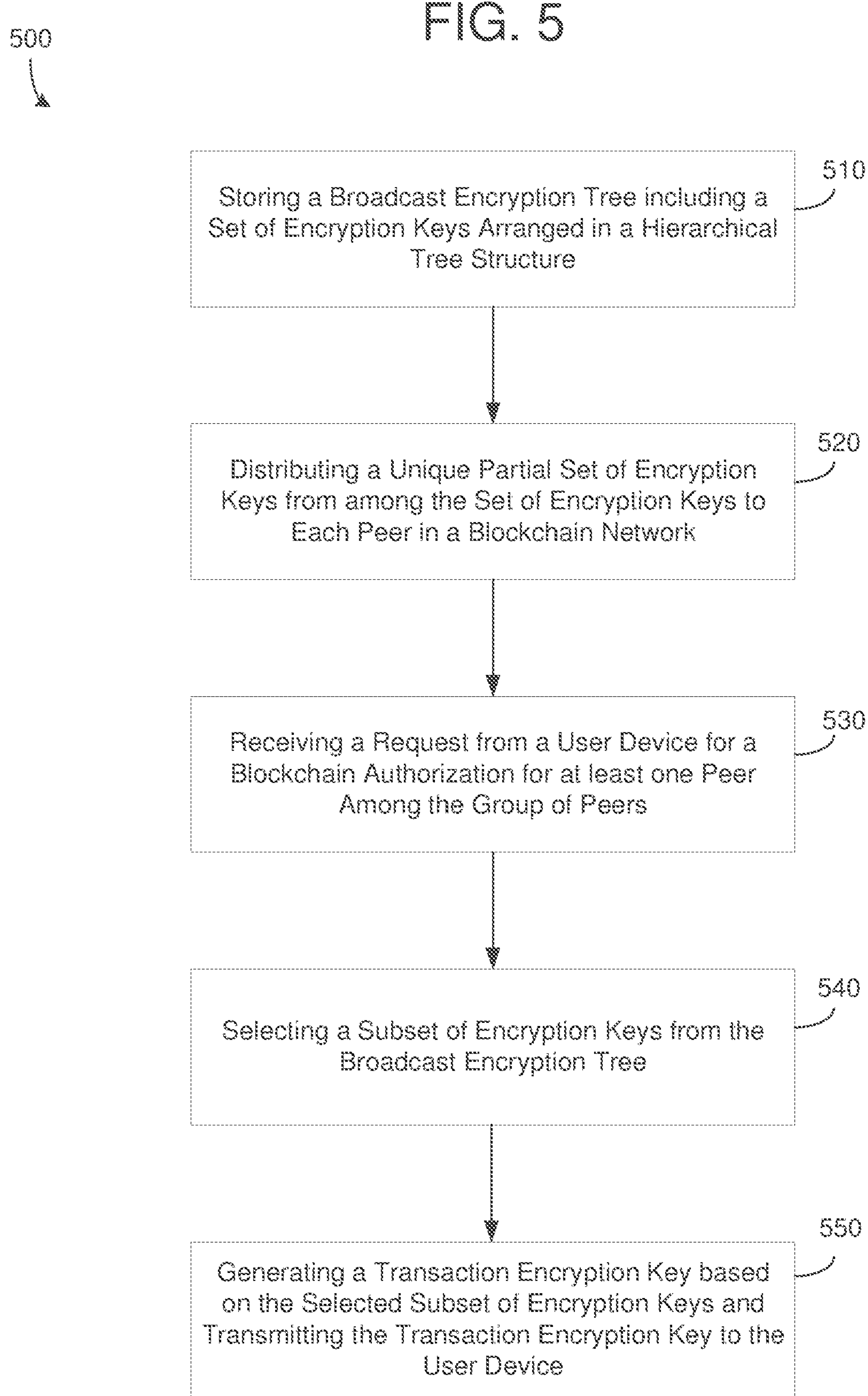
FIG. 5
500
Storing a Broadcast Encryption Tree including a Set of Encryption Keys Arranged in a Hierarchical Tree Structure
510
Distributing a Unique Partial Set of Encryption Keys from among the Set of Encryption Keys to Each Peer in a Blockchain Network
520
Receiving a Request from a User Device for a Blockchain Authorization for at least one Peer Among the Group of Peers
530
Selecting a Subset of Encryption Keys from the Broadcast Encryption Tree
540
Generating a Transaction Encryption Key based on the Selected Subset of Encryption Keys and Transmitting the Transaction Encryption Key to the User Device
550

BLOCKCHAIN TRANSACTION PRIVACY ENHANCEMENT THROUGH BROADCAST ENCRYPTION

TECHNICAL FIELD

This application generally relates to blockchain transactions, and more particularly, to blockchain transaction privacy enhancement through broadcast encryption.

BACKGROUND

A blockchain may be used as a public ledger to store information such as digital assets and the like. Because any individual or entity can often provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

In most cases, a blockchain platform, also referred to as a distributed ledger, requires a peer-to-peer network for processing blockchain transactions as well the above-mentioned consensus algorithms to ensure replication of the blockchain across all peers in the network is undertaken. However, due to the distributed nature of a blockchain network, controlling the processing of blockchain transactions or otherwise restricting the processing of blockchain transactions via a centralized authority can be difficult.

SUMMARY

In one example embodiment, provided is a blockchain transaction processing method that includes one or more of storing a broadcast encryption tree comprising a set of cryptographic keys disposed in a hierarchical tree format, distributing a partial set of keys from the broadcast encryption tree to each respective peer from among a group of peers included in a blockchain network, receiving, from a user device, an identification of at least one peer included in the group of peers for processing a blockchain transaction, selecting a subset of keys from among the set of cryptographic keys in the broadcast encryption tree which enables at least one peer to decrypt transactions and doesn't enable the remaining peers included in the group of peers to decrypt transactions, and transmitting broadcast encryption information about the selected subset of keys to the user device for performing encryption of the transactions.

In another example embodiment, provided is a computing system that includes one or more storage configured to perform one or more of store a broadcast encryption tree including a set of cryptographic keys disposed in a hierarchical tree format, a network interface configured to distribute a partial set of keys from the broadcast encryption tree to each respective peer from among a group of peers included in a blockchain network, and to receive, from a user device, an identification of at least one peer included in the group of peers for processing a blockchain transaction, and a processor configured to select a subset of keys from among the set of cryptographic keys in the broadcast encryption tree which is known to the at least one peer and which is not known to remaining peers included in the group of peers, wherein the network interface is further configured to transmit broadcast encryption information about the selected subset of keys to the user device for performing encryption of the transactions.

A non-transitory computer readable medium having stored therein program instructions that when executed cause a computer to perform one or more of storing a broadcast encryption tree comprising a set of cryptographic keys arranged in a hierarchical tree structure, distributing a partial set of cryptographic keys from the broadcast encryption tree to each peer among a group of peers included in a blockchain network, receiving, from a user device, an identification of at least one peer included in the group of peers authorized for processing a blockchain transaction, selecting a subset of cryptographic keys from among the set of cryptographic keys in the broadcast encryption tree which is known to the at least one peer and which is not known to remaining peers included in the group of peers, and transmitting information about the selected subset of cryptographic keys to the user device for performing broadcast encryption.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 5 is a diagram illustrating a method for restricting peers from processing a blockchain transaction in accordance with an example embodiment.

DETAILED DESCRIPTION

Figure 1:
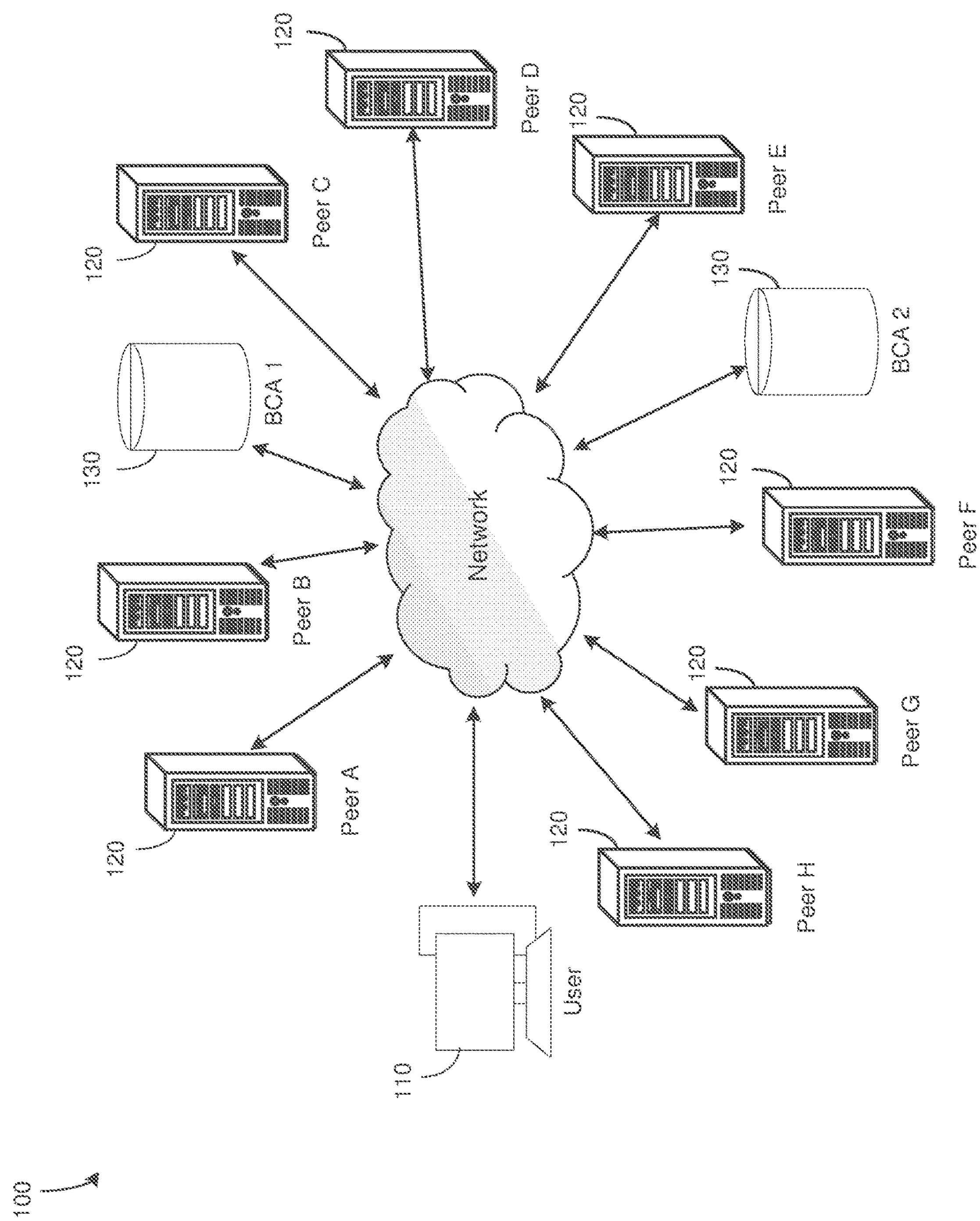
FIG. 1 is a diagram illustrating a broadcast encryption system including a plurality of peers in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment relates to managing a set of cryptographic keys and broadcasting a subset of the cryptographic keys to restrict decryption to only authorized blockchain peers.

The example embodiments are directed to a broadcast encryption technology which restricts blockchain transaction processing to only a limited subset of peers included within a larger overall group of peers that compose a blockchain network. A blockchain platform or environment typically involves a plurality of entry points (i.e., peers) which manage a shared blockchain in a distributed fashion (i.e., peer-to-peer). Peers are responsible for maintaining a replica of the blockchain data and processing blockchain transactions. To ensure replication is the same across the peers, the peers are typically subject to a consensus algorithm in order to ensure the replica is correct. However, situations may occur in which it is beneficial or required to allow only a subset of chosen peers from among a total set of peers in the blockchain network to process a blockchain transaction. For example, it may be necessary or otherwise preferable to restrict blockchain transaction processing to a smaller group of peers within a larger group of peers that make up the entire blockchain network due to security restrictions, internal group requirements within the blockchain network, parties to a contract, and the like.

The example embodiments are directed to a broadcast certificate authority (BCA) that is capable of managing and distributing a set of private cryptographic keys from among a larger set of private cryptographic keys to each peer that enable the peers to selectively decrypt blockchain transactions only when authorized. While peers may share some cryptographic keys, each peer may have their own unique partial set with respect to the other peers. The distribution of cryptographic keys provides some overlap between the peers such that a specific cryptographic key does not need to be dedicated for each peer. Furthermore, the BCA may receive a request from a user that indicates a subset of peers from among the entire group of peers that are authorized to process a blockchain transaction. Here, the subset of peers should be able to process a blockchain transaction while the remaining peers are prevented or restricted from processing the blockchain transaction.

The BCA may generate a transaction cryptographic key for the user based on a subset of private keys which only the subset of peers can access and which are not known to the remaining peers in the blockchain network. The subset of private keys may be taken from the overall set of private keys based on a hierarchical tree structure of keys thereby enabling specific peers within the network to decrypt the transaction while preventing the remaining peers from being able to decrypt the transaction. Accordingly, the remaining peers may be prevented from interpreting the content of the blockchain transaction and interfering with the result of the blockchain transaction on a transaction-by-transaction basis. The BCA may provide the user with a broadcast certificate including the transaction encryption key to be used by the user for encrypting blockchain processing data.

In order to manage the broadcast encryption tree, the BCA may determine a hierarchical arrangement of nodes through multiple levels of the tree based on a number of peers managed by the BCA, and assign private keys to each peer as the peer is enrolled with the BCA or during a subsequent process or update. Each peer may be assigned keys from multiple levels of the broadcast encryption tree based on the peer's location in the broadcast encryption tree. Furthermore, the BCA may maintain a list of the unique subsets of keys assigned to each peer managed by the BCA. The nodes in the broadcast encryption tree may be arranged in a hierarchical tree shape such as a binary tree, quadtree, or another type of tree, and each node may have a designated key. Also, the peers may correspond to the leaf nodes of the tree. Furthermore, each peer may be assigned its own unique subset of keys from the broadcast encryption tree from among an overall set of private keys included in the broadcast encryption tree.

FIG. 1 illustrates a broadcast encryption system 100 including a plurality of peers 120 in accordance with an example embodiment. In addition to the peers 120, the system 100 includes one or more broadcast certificate authorities (BCA) 130, and a user device 110, which are connected to each other via a network. For example, the user device 110, the peers 120, and the BCAs 130 may be connected via a public network or a private network in a peer-to-peer format or another type of distributed network format. The system 100 may be able to scale up and down by adding more BCAs as the system 100 adds peers 120. In this example, the system 100 includes eight peers 120 and two BCAs 130, but embodiments are not limited thereto. Each BCA 130 may manage encryption keys for one or more of the peers 120.

When the user device 110 desires to limit the peers 120 within the system 100 that are able to process a blockchain transaction, the user device 110 may transmit a request to one or more of the BCAs 130 identifying target peers within the group of peers 120 which the user wants to be able to encrypt and process a blockchain transaction. Accordingly, the BCA 130 may generate a transaction cryptographic key for the user device based on the target peers that are managed by the BCA 130 and that are authorized to process the blockchain transaction. Here, the BCA 130 may provide the transaction encryption key to the user device 110 thereby enabling the user device 110 to generate and send encrypted blockchain transactions capable of being decrypted by only the target peers. Examples of private key management and distribution are shown and described with respect to FIGS. 3A and 3B, below. When the user device 110 receives the transaction encryption key, the user device may encrypt a blockchain transaction and broadcast the encrypted blockchain transaction to all peers 120. However, only those peers with a private key associated with the transaction key are able to decrypt the transaction details. Meanwhile, the remaining peers are unable to decrypt the blockchain transaction and therefore unable to process the blockchain transaction and therefore are prevented from interfering with the blockchain processing.

The system 100 has a number of advantages over previous blockchain authorization techniques. For example, the system 100 uses broadcast encryption to guarantee that only authorized peers are able to decrypt and process blockchain transactions. In particular, a set of private keys are distributed between the peers that compose the system 100. The distribution ensures that a smaller set of peers within the larger overall network of peers is able to decrypt a transaction without requiring a linear number of encryptions of the key to be used to decrypt the transaction payload. Furthermore, the BCA 130 has the responsibility to determine a subset of keys from among an overall set of private encryption keys to enable only an authorized subset of peers to be able to process the blockchain transaction from a larger group of peers. This invention enables the blockchain transaction to be propagated throughout the blockchain network via broadcast transmission while at the same time limiting the peers that can process the broadcast transaction.

During an enrollment process (or another process such as a subsequent update or initiation of the broadcast encryption) peers are provided a unique partial set of private keys according to the BCA 130. How the partial sets of private keys are distributed, the size of the tree, and other characteristics, may be determined by the implementation of the BCA 130. Each BCA 130 may generate and maintain its own broadcast encryption tree based on the peers that it manages. Each BCA 130 may distribute private subsets of keys to the peers it manages, and also generate broadcast certificates for users who desire to transmit blockchain transactions to the peers but want to restrict the peers that are authorized to process the blockchain transaction.

A broadcast certificate may be determined based on encryption keys assigned to the subset of peers that are authorized to process the transaction. The broadcast certificate may be signed using a BCA's private key. The transaction key (TKey) is a symmetric key used to encrypt blockchain transaction content. This key is generated by the BCA and is encrypted with a user's public key. The TKey may be chosen by the BCA based on the subset of peers authorized for processing. The broadcast certificate may also include a transaction key block (TKB) which includes the transaction key encrypted using one or more private encryption keys of the authorized subset of peers.

As a non-limiting example, the broadcast certificate may include the transaction key encrypted using different private encryption keys for different authorized peers (or subgroups of peers). For example, a first private encryption key assigned to a first peer (or first subgroup) may be used to encrypt the transaction key, and a second private encryption key assigned to a second peer (or second subgroup) may be used to encrypt a separate copy of the transaction key such that both peers can decrypt the transaction key with different private encryption keys. After obtaining the broadcast certificate, the user device may encrypt the content from multiple transactions with the TKey encrypted with a user's public key that may be included in the broadcast certificate. Meanwhile, changes to the shared ledger may be generated as a result of the execution of the transaction and provided to all peers. Accordingly, only those peers with the access to specific private encryption keys may be able to decrypt the transaction key and provide execution of the transaction while peers that are not aware of the transaction key cannot interfere with the transaction. In addition, because of the hierarchical nature of the broadcast encryption tree, a single private encryption key may be used by more than one peer while still being unknown to other peers thus reducing the number of private encryption keys. Furthermore, the system does not require a separate private encryption key to be used for each peer.

Figure 2:
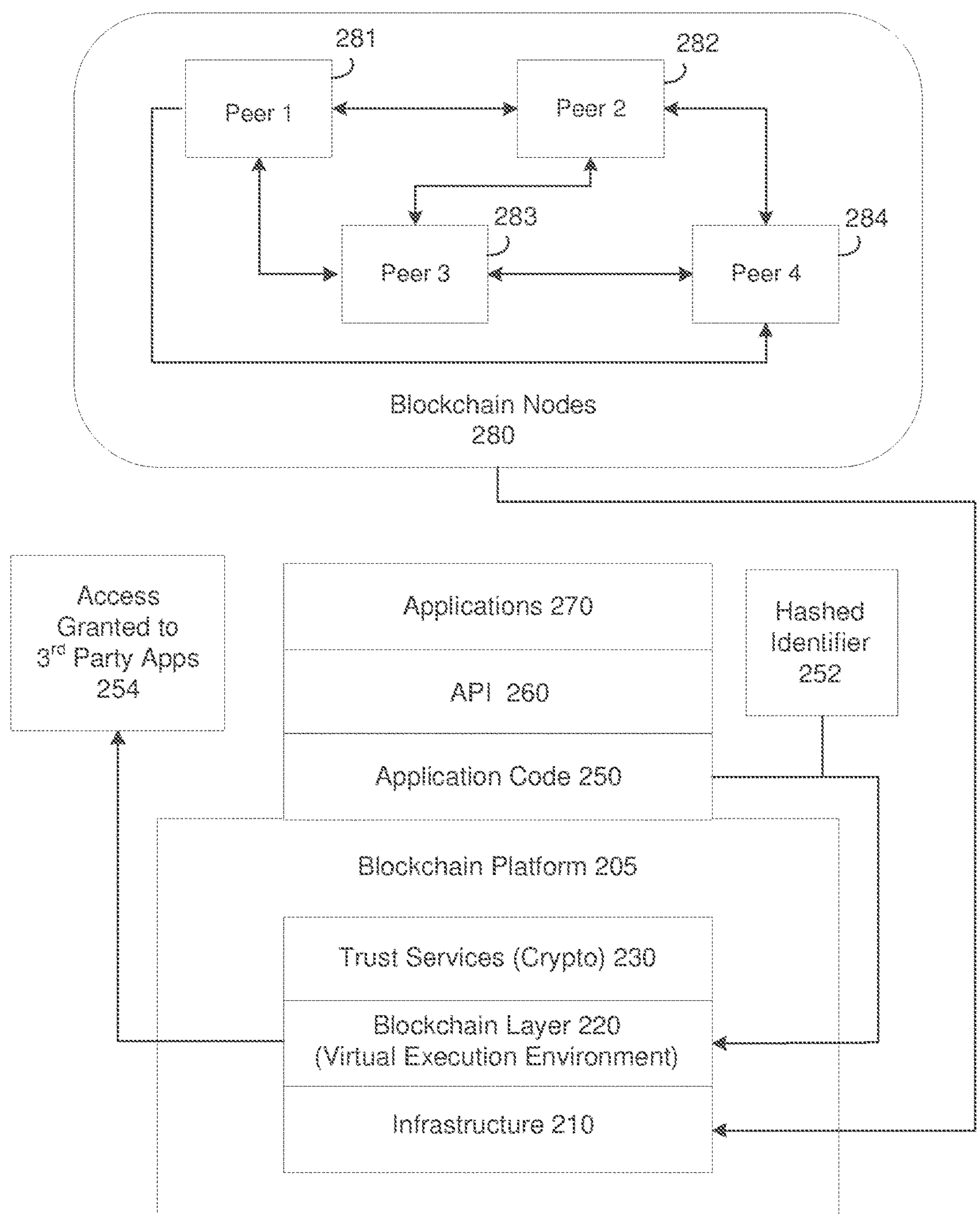
FIG. 2 is a diagram illustrating a blockchain system configuration in accordance with an example embodiment.

FIG. 2 illustrates a blockchain system database configuration, according to example embodiments. Referring to FIG. 2, blockchain system 200 may include certain common blockchain elements, for example, a group 280 of assigned peer blockchain nodes 281-284 which participate in blockchain transaction addition and validation process (consensus). As an example, the peers 120 shown in FIG. 1 may be the peer blockchain nodes 281-284, etc. Any of the blockchain peer nodes 280 may initiate a blockchain authentication and seek to write to a blockchain immutable ledger stored in blockchain layer 220, a copy of which may also be stored on the underpinning physical infrastructure 210. In this configuration, the customized blockchain configuration may include one or applications 270 which are linked to application programming interfaces (APIs) 260 to access and execute stored program/application code (e.g., chain code and/or smart contracts) 250, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 205 may include various layers of blockchain data, services (e.g., cryptographic trust services, virtual execution environment), and underpinning physical computer infrastructure necessary to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain configuration of FIG. 2 may process and execute program/application code 250 by way of one or more interfaces exposed, and services provided, by blockchain platform 205. The code may control blockchain assets. For example, the code can store and transfer data, and may be executed by the blockchain in the form of a smart contract and associated chain code with conditions or other code elements subject to its execution. The smart contracts 250 may be created to execute reminders, updates, and/or other notifications subject to the changes, updates, etc. The smart contracts can themselves be used to identify rules associated with authorization and access requirements and usage. For example, hashed identifier information 252 received from a user device may be processed by one or more processing entities (virtual machines) included in the blockchain layer 220. The result may include access being granted 254 to a third party application from the blockchain computing environment (VM). In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device submitted operation or as further described herein, by a broker agent. The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3A:
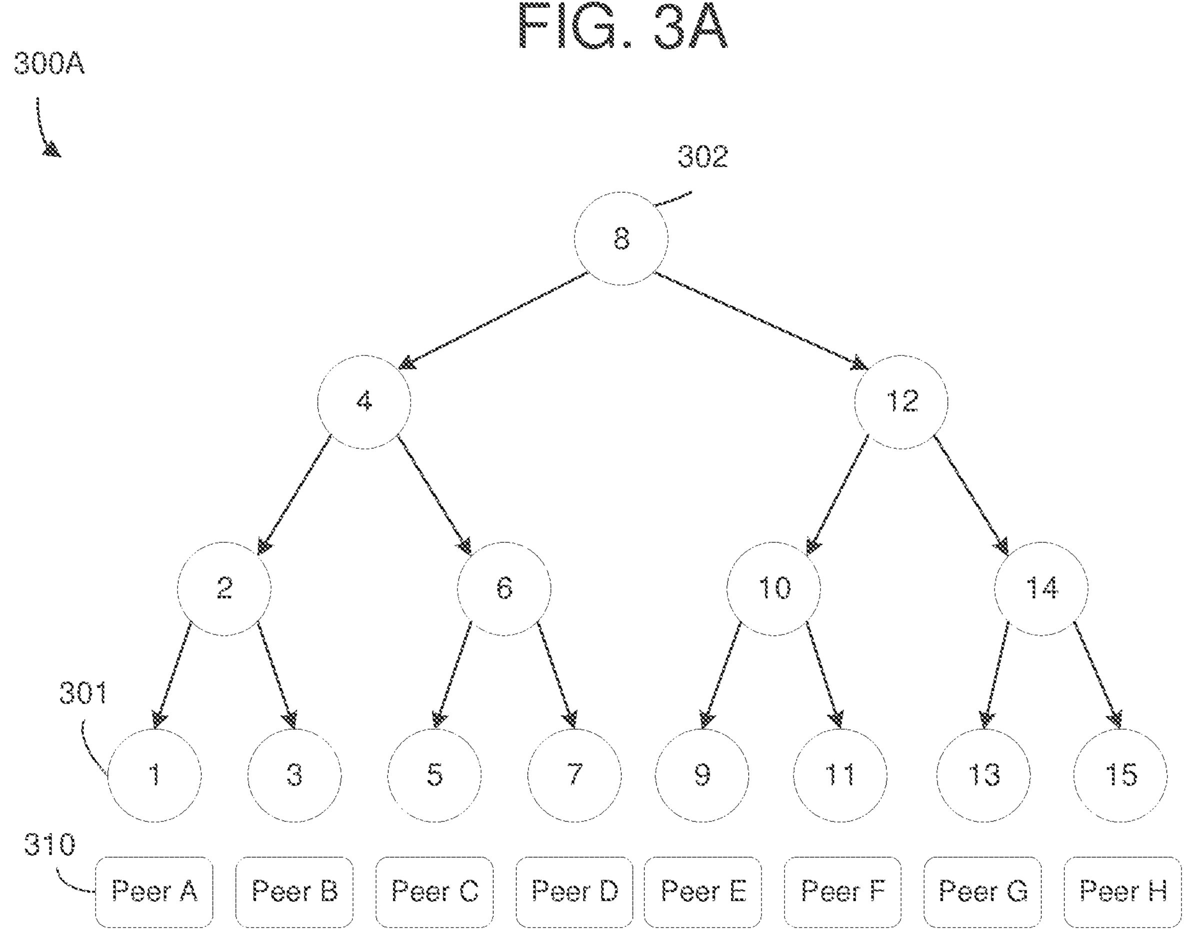
FIGS. 3A-3B are diagrams illustrating managing and distributing private cryptographic keys within a broadcast encryption tree in accordance with example embodiments.
Figure 3B:
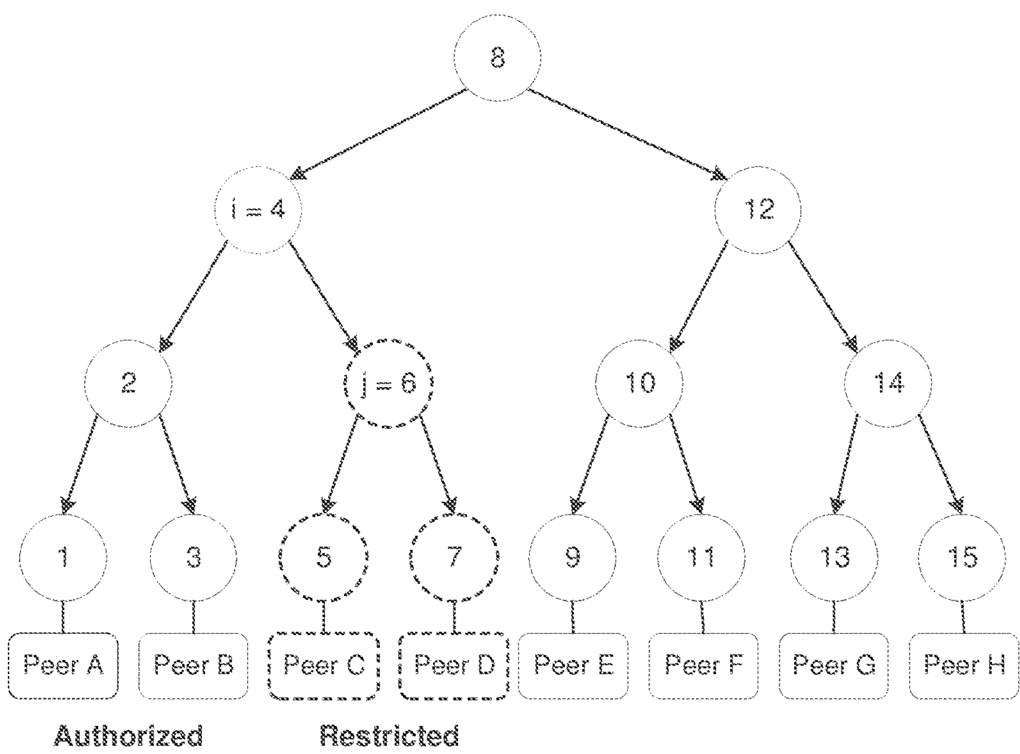

FIGS. 3A-3B illustrate examples of managing and distributing private encryption keys within a broadcast encryption tree in accordance with example embodiments. In FIG. 3A, a process 300A is shown in which encryption keys (i.e., 15 private encryption keys) are arranged in a hierarchical order and distributed to a plurality of peers (peers A-H). A one-way hash function may be used to determine a parent node key from a child node key. For example, using encryption key 1 301, the one-way hash function can be used to determine encryption key 2, and then performed again to determine encryption key 4, and then performed again to determine encryption key 8. In this case, the leaf nodes (1, 3, 5, 7, 9, 11, 13, and 15) are associated with peers A, B, C, D, E, F, G, and H, respectively.

However, the encryption keys are not assigned on this basis on-to-one basis. Rather, to prevent peer A 310 from having access to some keys in the broadcast encryption tree, the BCA does not assign key 1 301 to peer A 310. Furthermore, private keys 2, 4, and 8 are also not assigned to peer A 310. As a result, peer A 310 does not have access to any of the encryption keys along the branch path from the root node 302 to the leaf node 301 that is associated with peer A 310. Instead, peer A 310 is assigned keys 3, 6, and 12 which correspond to other branches of the tree which are not on the direct path to the leaf node 301 associated with peer A 310. The other peers are also assigned keys in a similar fashion. The subsets of keys assigned to each peer are stored in a table 320. For example, peer B is assigned encryption key 1, but not encryption keys 3, 4, and 8 which are a long a direct path between peer B and the root node 302. In the example embodiments, a peer does not have access to an encryption key of a node between a direct path from the leaf node associated with the peer to the root node 302.

FIG. 3B illustrates an example 300B of the BCA selecting a subset of keys for generating a broadcast certificate such that certain peers (e.g., peers C and D) are prevented from encrypting a blockchain transaction while peers A and B can be authorized for encryption blockchain transactions. In this example, the coverage for peers A and B is composed by a subtree of nodes. Here, the subtree of nodes is defined by a root node i and a subnode of i which is j. In the example of FIG. 3B, the subset is defined by node i=4 and subnode j=6. In this case, all nodes within the subtree i but not in the subtree j (i.e., peers A and B) form part of the coverage. Meanwhile the peers (C and D) which are included in the subtree j are restricted from coverage. In this example, the key (encryption key 6) that corresponds to the subnode j is used as the selected private encryption key by the BCA in order to enable peers A and B to perform encryption.

Furthermore, the BCA may generate a transaction key and encrypt the transaction key using private encryption key 6. In this case, because both nodes A and B have access to private encryption key 6, but nodes C and D do not, nodes A and B may be authorized for encryption while nodes C and D are restricted from encryption. The encrypted transaction key may be included in a broadcast certificate which is provided to a user device which encrypts transaction payloads and broadcasts them to the peer network. In this case the transaction key may be encrypted using a user's public key. Accordingly, the user may encrypt blockchain transaction data and broadcast the encrypted transaction data to all peers. However, only those peers with access to private encryption key 6 will be able to decrypt the blockchain transaction and participate in executing the blockchain transaction. It should also be appreciated that the transaction key could be encrypted more times using different private encryption keys based on the number of subtrees defining the coverage. For example, the BCA could select additional private encryption keys to expand the coverage to include peers E, F, G, and H, by including encryption key 4 which is not known to peers C and D, but which is known to peers E, F, G, and H. Accordingly, the BCA may encrypt the transaction key more times using the additional private encryption keys.

The example embodiments may be combined with existing consensus algorithms. For example, consensus steps can take place after the blockchain transaction is executed by only the authorized nodes such that only the authorized nodes have access in the resulting transaction via the consensus. The selected nodes will be the ones to participate in the consensus while the other nodes behave as peers.

Figure 4:
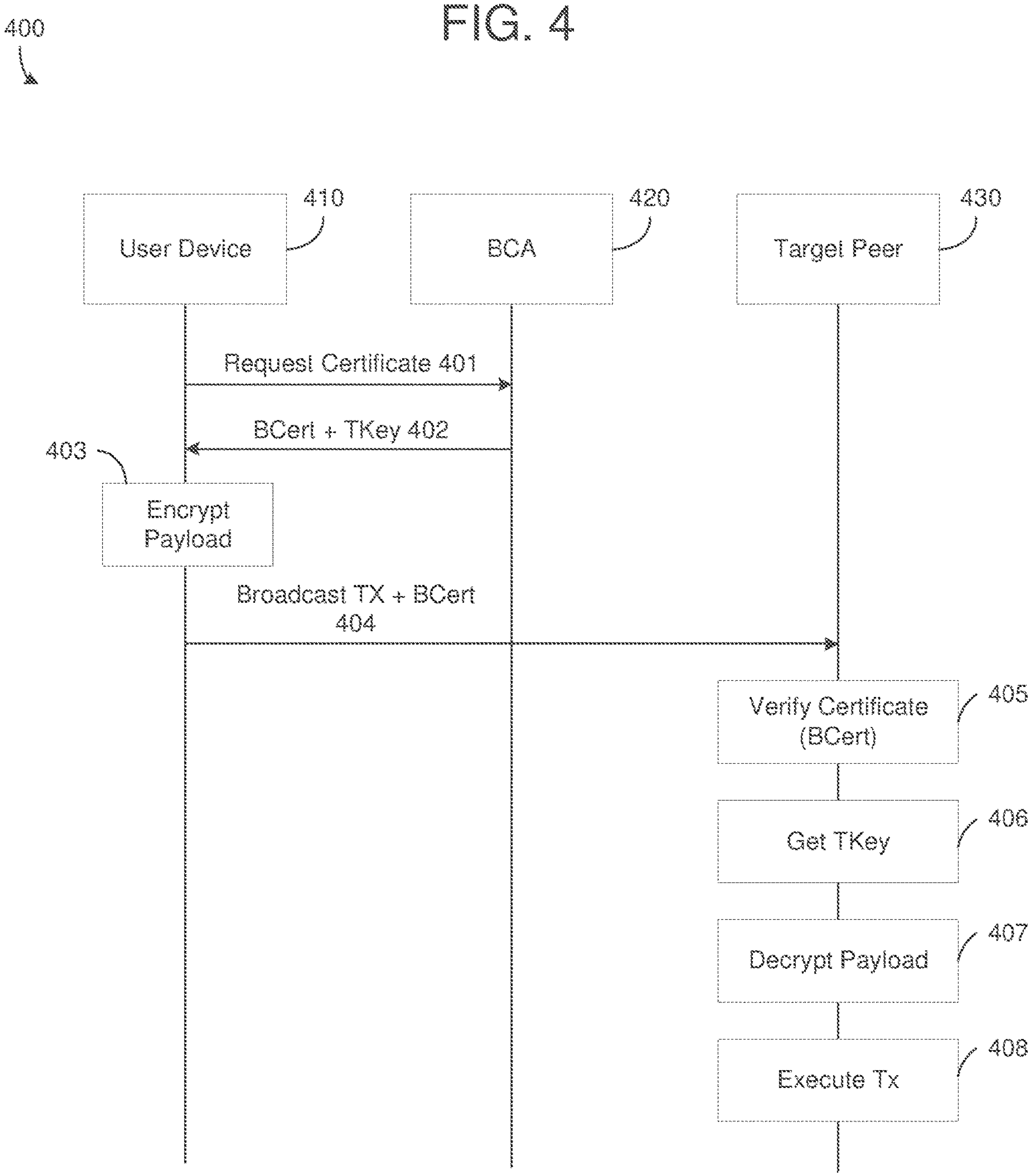
FIG. 4 is a diagram illustrating a transmission sequence for broadcast encryption in accordance with an example embodiment.

FIG. 4 illustrates a transmission sequence 400 for broadcast encryption in accordance with an example embodiment. In this example, a user device 410 request a BCA 420 for a broadcast certificate to authorize target peer 430 to encryption transaction data. In 401, the user device 410 transmits a request for the broadcast certificate to the BCA 420 along with an identification of a target group of peers from among the overall group of peers in the blockchain network. In response, in 402 the BCA 420 provides a broadcast certificate associated with a transaction key encrypted using a set of cryptographic keys known to target group of peers, this section of multiples encrypted data is considered the Transaction Key Block (TKB), at the worst scenario the transaction key requires be encrypted a logarithmic number of times with respect to the number of tree leaves and the transaction key encrypted using the user's public key is sent outside the certificate. Accordingly, in 403 the user device 410 encrypts a blockchain transaction payload with the transaction key. Furthermore, the user device appends the broadcast certificate to the encrypted transaction and, in 404, submits the encrypted blockchain transaction along with the broadcast certificate to the blockchain network via a broadcast communication.

Every peer receiving the blockchain transmission will verify the broadcast certificate in 405 and attempt to decrypt the transaction key included in the broadcast certificate, in 406. However, only those peers with authorized access to a private encryption key used to encrypt the transaction key will successfully gain access to the transaction key, in 406. In 407, the peers that gain successful access to the transaction key will decrypt the payload and execute the transaction in 408. Meanwhile, the restricted peers will not perform 407 or 408.

FIG. 5 illustrates a method 500 for restricting peers from processing a blockchain transaction in accordance with an example embodiment. For example, the method 500 may be performed by a broadcast certificate authority system which may include a computing device such as a server, a cloud platform, a workstation computer, a user device, and the like. In 510, the method includes storing a broadcast encryption tree that includes a set of encryption keys arranged in a hierarchical tree structure. For example, the broadcast encryption key may be a binary tree such as shown in the examples of FIGS. 3A and 3B, or another type of tree such as a quadtree, or the like. Although not shown in FIG. 5, the method may also include generating the broadcast encryption tree based on an amount of peers included in the group of peers.

In some embodiments, the broadcast encryption tree may include a hierarchical arrangement of nodes and each node in the tree may be assigned a respective encryption key from among the set of encryption keys. The key assigned to a child node is derived from a key assigned to parent node making of a one-way hash function. In addition, each peer in the blockchain network may correspond to a respective leaf node in the broadcast encryption tree. That is, a peer may be uniquely assigned to a leaf node included in the broadcast encryption key.

In 520, the method includes distributing a unique partial set of encryptions keys from the broadcast encryption tree to each peer among a group of peers included in a blockchain network. The unique partial sets of encryption keys may be distributed to the peers during an enrollment process or an update process. Each peer may receive a unique subset of encryptions keys such that each peer includes some but not all of the encryption keys that are used by the blockchain network based on a design of the broadcast encryption tree. In some embodiments, the method may further include assigning a unique partial set of encryption keys to the peers such that a peer does not have an encryption key of a node that is on a direct path from a leaf node corresponding to the peer to a root node of the broadcast encryption tree. For example, a peer may be assigned an encryption key from each branch of the broadcast encryption tree except the branch including the leaf node associated with the peer.

In 530, the method includes receiving, from a user device, an identification of at least one peer included in the group of peers authorized for processing a blockchain transaction. As another example, the user may provide a rule or criteria (for instance: peers located in Argentina, peers associated to organizations X or Y) to determine the involving peers and finally the BCA could apply its internal conditions over the retrieved peers (for instance: removing peer that were revoked before). For example, the user device may transmit a request for a broadcast encryption certificate to the broadcast certificate authority. The request may identify a subset of peers included within the entire group of peers in the network. In response, in 540, the broadcast certificate authority may select a subset of encryption keys from among the set of encryption keys in the broadcast encryption tree which enables at least one peer to decrypt the transaction and doesn't enable remaining peers included in the group of peers.

In 550, the method includes transmitting information about the selected subset of encryption keys to the user device for performing broadcast encryption. For example, the broadcast certificate authority may generate a broadcast certificate based on the selected subset of encryption keys and transmit the broadcast certificate to the user device. In this example, the broadcast certificate includes a transaction key that is generated by the broadcast certificate authority and is encrypted based on the selected subset of cryptographic keys. This transaction key is used by the user to encrypt the transaction.

Figure 6:
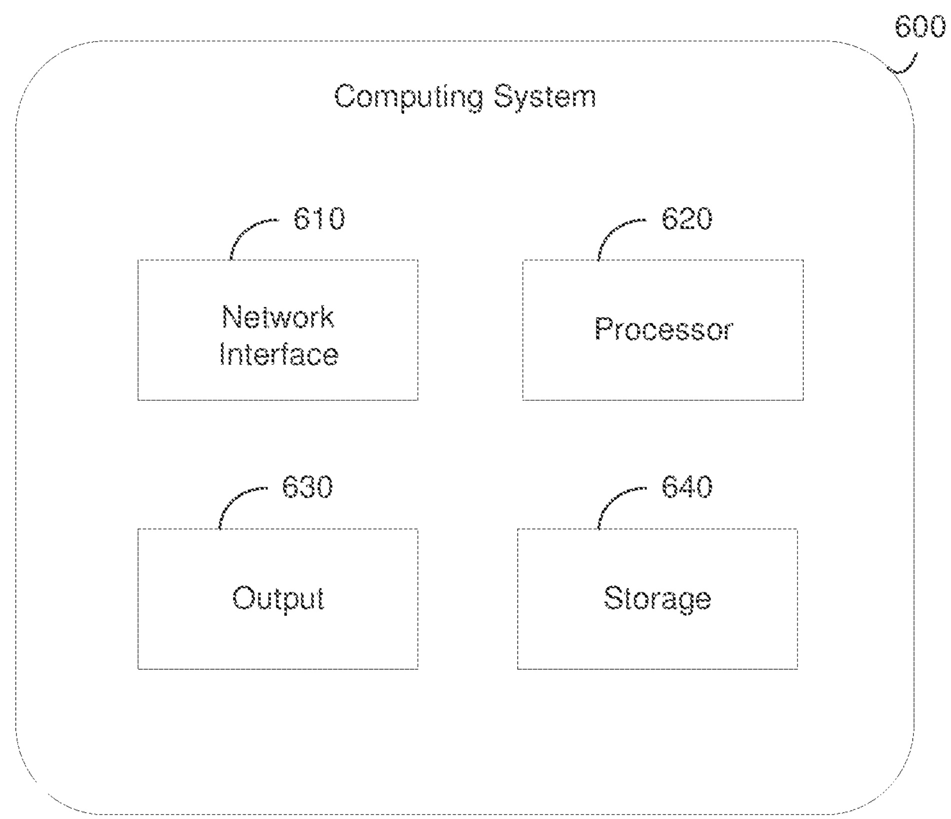
FIG. 6 is a diagram illustrating a computing system for restricting peers from processing a blockchain transaction in accordance with an example embodiment.

FIG. 6 illustrates a computing system 600 for restricting peers from processing a blockchain transaction in accordance with an example embodiment. For example, the computing system 600 may be the BCA 130 shown in FIG. 1, or another server, device, and the like. Also, the computing system 600 may perform the method 500 of FIG. 5. Referring to FIG. 6, the computing system 600 includes a network interface 610, a processor 620, an output 630, and a storage device 640. The network interface 610 may transmit and receive data via the Internet, a private network, a public network, and the like. The network interface 610 may be a wireless interface, a wired interface, or the like. The processor 620 may include one or more processing devices each including one or more processing cores. In some examples, the processor 620 is a multicore processor or a plurality of multicore processors. The output 630 may output data to an embedded display of the computing system 600, an externally connected display, a cloud platform, and the like. The storage device 640 is not limited to any kind of storage device and may include any known memory device such as RAM, ROM, hard disk, and the like. The storage 640 may store a broadcast encryption tree including a set of encryption keys for a plurality of peers that make up a blockchain network.

According to various embodiments, the processor 620 may control the network interface 610 to distribute a unique partial set of cryptographic keys from the broadcast encryption tree to each peer from among a group of peers included in a blockchain network. The broadcast encryption tree may include a hierarchical arrangement of nodes in a binary tree that includes a plurality of levels in which each level includes twice as many nodes, or the like. In this example, each node in the tree may be assigned a respective cryptographic key from among the set of keys. Furthermore, each peer may correspond to a respective leaf node in the broadcast encryption tree, and an cryptographic key assigned to a leaf node is generated based on an cryptographic key assigned to its parent node. In this example, the processor 620 may assign a unique partial set of cryptographic keys to each peer such that the peer does not have a key of a node that is on a direct path from a leaf node corresponding to the peer to a root node of the broadcast encryption tree.

The network interface 610 may receive, from a user device, an identification of at least one peer included in the group of peers authorized for processing a blockchain transaction. In response, the processor 620 may select a subset of cryptographic keys from among the set of keys in the broadcast encryption tree which enables the at least one peer to decrypt the transaction and which doesn't enable to remaining peers included in the group of peers to decrypt the transaction. Based on the selected set of cryptographic keys, the processor may generate a transaction key for the user device to use to restrict encryption of a blockchain transaction. The transaction key is generated by the BCA and is encrypted in such a way that only a subset of the peers are able to decrypt it. Furthermore, the processor 620 may generate a broadcast certificate including the generated transaction key for the user device and control the network interface 610 to transmit the broadcast certificate to the user device.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

What is claimed is:

1. A method, comprising:

receiving, by a computer device, an identification of at least two peers authorized for processing a blockchain transaction from a user device;

selecting, by the computer device, a cryptographic key corresponding to a leaf node in a broadcast encryption tree, the cryptographic key being shared between different sets of cryptographic keys of the at least two peers; and transmitting, by the computer device, information about the selected cryptographic key to the user device for performing broadcast encryption;

wherein each of the peers is assigned a different set of cryptographic keys such that each of the peers does not have a cryptographic key of the leaf node when it is on a direct path from the peer to a root node of the broadcast encryption tree.

2. The method of claim 1, wherein the broadcast encryption tree includes a hierarchical arrangement of nodes in a binary tree, and wherein the method further comprises:

assigning each node a respective cryptographic key from among the set of cryptographic keys.

3. The method of claim 1, wherein each peer, of the at least two peers, corresponds to a respective leaf node in the broadcast encryption tree.

4. The method of claim 1, wherein each of the different sets includes at least one cryptographic key in common with another different set.

5. The method of claim 1, further comprising:

generating a broadcast certificate based on the selected cryptographic key, and wherein the transmitting further comprises:

transmitting the broadcast certificate to the user device.

6. The method of claim 5, wherein the broadcast certificate comprises:

a transaction key for encrypting blockchain transactions, the transaction key being encrypted using the selected cryptographic key.

7. The method of claim 1, further comprising:

generating the broadcast encryption tree based on an amount of peers.

8. The method of claim 1, further comprising:

distributing the different overlapping sets of cryptographic keys to the at least two peers during an enrollment process.

9. A computing system, comprising:

a processor that when executing one or more instructions in a memory is configured to:

receive, from a user device, an identification of at least two peers authorized to process a blockchain transaction;

a cryptographic key corresponding to a leaf node in a broadcast encryption tree, the cryptographic key being shared between different sets of cryptographic keys of the at least two peers; and transmit information about the selected cryptographic key to the user device to perform broadcast encryption;

wherein each of the peers is assigned a different set of cryptographic keys such that each of the peers does not have a cryptographic key of the leaf node when it is on a direct path from the peer to a root node of the broadcast encryption tree.

10. The computing system of claim 9, wherein the broadcast encryption tree includes a hierarchical arrangement of nodes in a binary tree, and wherein the processor is further configured to:

assign each node a respective cryptographic key from among the set of cryptographic keys.

11. The computing system of claim 9, wherein each peer, of the at least two peers, corresponds to a respective leaf node in the broadcast cryptographic tree, and wherein the processor is further configured to:

generate an cryptographic key assigned to a leaf node based on a cryptographic key assigned to a parent node of the leaf node.

12. The computing system of claim 9, wherein each of the different sets includes at least one cryptographic key in common with another different set.

13. The computing system of claim 9, wherein the processor is further configured to:

generate a broadcast certificate based on the selected cryptographic key, and wherein, when the processor is configured to transmit information, the processor is further configured to:

transmit the broadcast certificate to the user device.

14. The computing system of claim 13, wherein the broadcast certificate comprises:

a transaction key for encrypting blockchain transactions, the transaction key being encrypted using the selected cryptographic key.

15. The computing system of claim 9, wherein the processor is further configured to:

generate the broadcast encryption tree based on an amount of peers.

16. The computing system of claim 9, wherein the processor is further configured to:

distribute different overlapping sets of cryptographic keys to the at least two peers during an enrollment process.

17. A non-transitory computer readable medium comprising one or more instructions that when executed by a processor cause the processor to perform:

receiving, from a user device, an identification of at least two peers authorized for processing a blockchain transaction;

selecting a cryptographic key corresponding to a leaf node in a broadcast encryption tree, the cryptographic key being shared between different sets of cryptographic keys of the at least two peers; and transmitting information about the selected cryptographic key to the user device for performing broadcast encryption;

wherein each of the peers is assigned a different set of cryptographic keys such that each of the peers does not have a cryptographic key of the leaf node when it is on a direct path from the peer to a root node of the broadcast encryption tree.

18. The non-transitory computer readable medium of claim 17, wherein the broadcast encryption tree includes a hierarchical arrangement of nodes in a binary tree, and wherein the one or more instruction further cause the processor to perform:

assigning each node a respective cryptographic key from among the set of cryptographic keys.

19. The non-transitory computer readable medium of claim 17, wherein each peer, of the at least two peers, corresponds to a respective leaf node in the broadcast encryption tree.

20. The non-transitory computer readable medium of claim 17, wherein each of the different sets includes at least one cryptographic key in common with another different set.

* * * * *